United States Patent
Bergquist et al.

(10) Patent No.: US 10,214,218 B2
(45) Date of Patent: *Feb. 26, 2019

(54) METHOD TO CONTROL A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

(71) Applicant: Scania CV AB, Södertälje (SE)

(72) Inventors: Mikael Bergquist, Huddinge (SE);
Mathias Björkman, Tullinge (SE);
Johan Lindström, Nyköping (SE);
Niklas Pettersson, Stockholm (SE)

(73) Assignee: SCANIA CV AB, Södertälje (SE)

( * ) Notice: Subject to any disclaimer, the term of this patent is extended or adjusted under 35 U.S.C. 154(b) by 130 days.

This patent is subject to a terminal disclaimer.

(21) Appl. No.: 15/511,592
(22) PCT Filed: Sep. 29, 2015
(86) PCT No.: PCT/SE2015/051019
  § 371 (c)(1),
  (2) Date: Mar. 15, 2017
(87) PCT Pub. No.: WO2016/053168
  PCT Pub. Date: Apr. 7, 2016

(65) Prior Publication Data
US 2017/0291610 A1   Oct. 12, 2017

(30) Foreign Application Priority Data
Sep. 29, 2014 (SE) ....................... 1451142

(51) Int. Cl.
  *F16H 3/00* (2006.01)
  *B60W 30/19* (2012.01)
  (Continued)

(52) U.S. Cl.
  CPC .............. *B60W 30/19* (2013.01); *B60K 6/365* (2013.01); *B60K 6/445* (2013.01); *B60K 6/543* (2013.01);
  (Continued)

(58) Field of Classification Search
  CPC ......................... F16H 3/72; F16H 2057/02034
  See application file for complete search history.

(56) References Cited

U.S. PATENT DOCUMENTS 3,744,333 A   7/1973  Hallberg
4,403,968 A   9/1983  Heidrich et al.
(Continued)

FOREIGN PATENT DOCUMENTS

CN   103403392 A   11/2013
CN   103732945 A   4/2014
(Continued)

OTHER PUBLICATIONS

International Preliminary Report on Patentability for PCT/SE2015/051019 dated Apr. 4, 2017.
(Continued)

*Primary Examiner* — Bickey Dhakal
(74) *Attorney, Agent, or Firm* — Moore & Van Allen PLLC; W. Kevin Ransom

(57) ABSTRACT

A method is provided to control a hybrid powertrain comprising an internal combustion engine, a gearbox, a range gearbox, and two electrical machines to achieve a shift operation from a low range position to a high range position with minimal to no torque interruption and optimal brake regeneration, on the one hand, and a large torque and a lame number of gear steps are achieved on the other hand.

16 Claims, 4 Drawing Sheets

(51) Int. Cl.

| | | |
|---|---|---|
| *B60K 6/365* | (2007.10) | |
| *B60K 6/445* | (2007.10) | |
| *B60K 6/547* | (2007.10) | |
| *B60W 20/00* | (2016.01) | |
| *F16H 61/686* | (2006.01) | |
| *F16H 3/72* | (2006.01) | |
| *F16H 37/04* | (2006.01) | |
| *B60W 20/15* | (2016.01) | |
| *B60K 6/543* | (2007.10) | |
| *B60W 10/06* | (2006.01) | |
| *B60W 10/08* | (2006.01) | |
| *B60W 10/105* | (2012.01) | |
| *B60W 10/11* | (2012.01) | |
| *F16H 3/091* | (2006.01) | |
| *F16H 61/04* | (2006.01) | |
| *F16H 61/688* | (2006.01) | |
| *F16H 63/50* | (2006.01) | |
| *F16H 37/10* | (2006.01) | |
| *F16H 61/66* | (2006.01) | |

(52) U.S. Cl.
CPC ............ *B60K 6/547* (2013.01); *B60W 10/06* (2013.01); *B60W 10/08* (2013.01); *B60W 10/105* (2013.01); *B60W 10/11* (2013.01); *B60W 20/00* (2013.01); *B60W 20/15* (2016.01); *F16H 3/091* (2013.01); *F16H 3/728* (2013.01); *F16H 37/046* (2013.01); *F16H 61/0403* (2013.01); *F16H 61/686* (2013.01); *F16H 61/688* (2013.01); *F16H 63/502* (2013.01); *B60W 2710/0644* (2013.01); *B60W 2710/081* (2013.01); *B60W 2710/083* (2013.01); *B60W 2710/1005* (2013.01); *B60Y 2200/92* (2013.01); *F16H 2003/008* (2013.01); *F16H 2037/102* (2013.01); *F16H 2061/6602* (2013.01); *F16H 2200/201* (2013.01); *F16H 2306/44* (2013.01); *Y02T 10/6239* (2013.01); *Y10S 903/911* (2013.01); *Y10S 903/918* (2013.01); *Y10S 903/919* (2013.01); *Y10S 903/93* (2013.01); *Y10S 903/945* (2013.01)

(56) References Cited

U.S. PATENT DOCUMENTS

| | | | |
|---|---|---|---|
| 5,407,401 | A | 4/1995 | Wolfgang et al. |
| 5,558,595 | A | 9/1996 | Schmidt et al. |
| 5,916,050 | A | 6/1999 | Coutant et al. |
| 6,044,931 | A | 4/2000 | Reed, Jr. et al. |
| 6,371,882 | B1 | 4/2002 | Casey et al. |
| 6,558,283 | B1 | 5/2003 | Schnelle |
| 6,811,508 | B2 | 11/2004 | Tumback |
| 8,231,491 | B2 | 7/2012 | Oba et al. |
| 8,251,165 | B2 | 8/2012 | Katsuta et al. |
| 9,073,546 | B2 * | 7/2015 | Kuroda .................. B60K 6/48 |
| 9,528,583 | B2 | 12/2016 | Lubke et al. |
| 9,770,969 | B2 * | 9/2017 | Bjorkman ............... B60K 1/02 |
| 9,945,448 | B2 | 4/2018 | Lindström et al. |
| 2003/0166429 | A1 | 9/2003 | Tumback |
| 2004/0112317 | A1 | 6/2004 | Tumback et al. |
| 2005/0227803 | A1 | 10/2005 | Holmes |
| 2005/0279073 | A1 | 12/2005 | Clauss et al. |
| 2007/0243966 | A1 | 10/2007 | Holmes et al. |
| 2008/0053723 | A1 | 3/2008 | Kozarekar |
| 2008/0103002 | A1 | 5/2008 | Holmes |
| 2009/0048747 | A1 | 2/2009 | Stridsberg |
| 2009/0320629 | A1 | 12/2009 | Akashi et al. |
| 2010/0216584 | A1 | 8/2010 | Lutoslawski |
| 2012/0021861 | A1 * | 1/2012 | Sakai .................... B60K 6/365 475/5 |
| 2013/0260936 | A1 | 10/2013 | Takei et al. |
| 2013/0337961 | A1 | 12/2013 | Kaltenbach |
| 2014/0024490 | A1 | 1/2014 | Bangura et al. |
| 2014/0046527 | A1 | 2/2014 | Ito et al. |
| 2014/0150604 | A1 | 6/2014 | Kaltenbach |
| 2015/0072823 | A1 | 3/2015 | Rintoo |
| 2015/0184726 | A1 | 7/2015 | Rekow et al. |
| 2015/0292606 | A1 | 10/2015 | Lubke et al. |
| 2015/0292610 | A1 | 10/2015 | Rintoo |
| 2016/0264127 | A1 | 9/2016 | Nilsson et al. |
| 2017/0015299 | A1 | 1/2017 | Bjorkman et al. |
| 2017/0015300 | A1 | 1/2017 | Lindstrom et al. |
| 2017/0015303 | A1 | 1/2017 | Bjorkman et al. |
| 2017/0015304 | A1 | 1/2017 | Bjorkman et al. |
| 2017/0015305 | A1 | 1/2017 | Bjorkman et al. |
| 2017/0015306 | A1 | 1/2017 | Bjorkman et al. |
| 2017/0021819 | A1 | 1/2017 | Lindstrom et al. |
| 2017/0282700 | A1 * | 10/2017 | Bergquist ............... B60K 6/365 |
| 2017/0305256 | A1 * | 10/2017 | Bergquist ............... B60K 6/543 |

FOREIGN PATENT DOCUMENTS

| | | |
|---|---|---|
| DE | 10021025 A1 | 11/2001 |
| DE | 102005049992 A1 | 4/2007 |
| DE | 102007022129 A1 | 11/2008 |
| DE | 102011005028 A1 | 9/2012 |
| DE | 102011080069 A1 | 1/2013 |
| DE | 102012220063 | 4/2014 |
| SE | 1450305 | 9/2014 |
| SE | 1450308 A1 | 9/2014 |
| WO | 2008046185 A1 | 4/2008 |
| WO | WO2014067734 A1 | 5/2014 |
| WO | 2014158076 A1 | 10/2014 |

OTHER PUBLICATIONS

Korean Search Report for Korean Patent Application No. 10-2017-7010676 dated Apr. 12, 2018.
International Search Report for PCT/SE2015/051019 dated Jan. 19, 2016.
Written Opinion of the International Searching Authority for PCT/SE2015/051019 dated Jan. 19, 2016.

* cited by examiner

METHOD TO CONTROL A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

CROSS-REFERENCE TO RELATED APPLICATION(S)

This application is a national stage application (filed under 35 § U.S.C. 371) of PCT/SE2015/051019, filed Sep. 29, 2015 of the same title, which, in turn claims priority to Swedish Application No. 1451142-2, filed Sep. 29, 2014 of the same title; the contents of each of which are hereby incorporated by reference.

FIELD OF THE INVENTION

The present invention relates to a method and computer program product to control a hybrid powertrain in a vehicle.

BACKGROUND OF THE INVENTION

Hybrid vehicles may be driven by a primary motor, which may be an internal combustion engine, and a secondary motor, which may be an electrical machine. The electrical machine is equipped with at least one energy storage device, such as an electro-chemical energy storage device, for storage of electric power, and control equipment to control the flow of electric power between the energy storage device and the electrical machine. The electrical machine may thus alternately operate as a motor and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the internal combustion engine. The stored electric power is used later for operation of the vehicle.

A gearbox in a hybrid vehicle may comprise a planetary gear. The planetary gear usually comprises three components, which are rotatably arranged in relation to each other, namely a sun wheel, a planetary wheel carrier and a ring gear. With knowledge about the number of teeth in the sun wheel and the ring gear, the mutual rotational speeds of the three components may be determined during operation. One of the components of the planetary gear may be connected with an output shaft in an internal combustion engine. This component of the planetary gear thus rotates with a rotational speed corresponding to the rotational speed of the output shaft in the internal combustion engine. A second component in the planetary gear may be connected with an input shaft to a transmission device. This component of the planetary gear thus rotates with the same rotational speed as the input shaft to the transmission device. A third component in the planetary gear is connected with a rotor in an electrical machine to achieve hybrid operation. This component in the planetary gear thus rotates with the same rotational speed as the rotor of the electrical machine, if they are directly connected with each other. Alternatively, the electrical machine may be connected with the third component of the planetary gear via a transmission that has a gear ratio. In this case, the electrical machine and the third component in the planetary gear may rotate with different rotational speeds.

The engine speed and/or the torque of the electrical machine may be controlled steplessly. During operating modes when the input shaft to the transmission device should be provided with a desired rotational engine speed and/or torque, a control unit having knowledge about the engine speed of the internal combustion engine calculates the rotational speed with which the third component must be operated, in order for the input shaft to the transmission device to obtain the desired rotational speed. A control unit activates the electrical machine, such that it provides the third component with the calculated rotational speed, and thus the input shaft to the transmission device with the desired rotational speed.

By connecting the internal combustion engine's output shaft, the electrical machine's rotor and the transmission device's input shaft with a planetary gear, the conventional clutch mechanism may be avoided. At acceleration of the vehicle, an increased torque must be delivered from the internal combustion engine and the electrical machine to the transmission device, and further to the vehicle's driving wheels. Since both the internal combustion engine and the electrical machine are connected with the planetary gear, the largest possible torque delivered by the internal combustion engine and the electrical machine will be limited by one of these drive units; i.e. the one whose maximum torque is lower than the other drive unit's maximum torque, having regard to the gear ratio between them. In case the electrical machine's highest torque is lower than the internal combustion engine's highest torque, having regard to the gear ratio between them, the electrical machine will not be able to generate a sufficiently large reaction torque to the planetary gear, which results in that the internal combustion engine may not transfer its highest torque to the transmission device and further to the vehicle's driving wheels. Thus, the highest torque that may be transferred to the transmission device is limited by the electrical machine's strength. This is also apparent from the so-called planet equation.

Using a conventional clutch, which disconnects the gearbox's input shaft from the internal combustion engine during shifting processes in the gearbox, entails disadvantages, such as heating of the clutch discs, resulting in wear of the clutch discs and an increased fuel consumption. A conventional clutch mechanism is also relatively heavy and costly. It also occupies a relatively large space in the vehicle.

In a vehicle, the space available for the drive arrangement is often limited. If the drive arrangement comprises several components, such as an internal combustion engine, an electrical machine, a gearbox and a planetary gear, the construction must be compact. If there are additional components, such as a regenerative braking device, the requirements that the components must have a compact construction are even more stringent. At the same time, the components in the drive arrangement must be designed with dimensions that are able to carry the required forces and torque.

For some types of vehicles, especially heavy vehicles and buses, a large number of gear steps are required. Thus, the number of components in the gearbox increases, which must also be dimensioned to be able to carry large forces and torque arising in such heavy vehicles. This results in an increase of the size and weight of the gearbox.

There are also requirements for high reliability and high operational security of the components comprised in the drive device. In case the gearbox comprises disc clutches, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electrical machines. The more cycles, the shorter the life of the energy storage device.

During some operating conditions, it is desirable to shut off the internal combustion engine in order to save fuel and to avoid cooling down of the internal combustion engine's exhaust aftertreatment system. The vehicle is then driven by the electrical machine. When a torque addition is required in the hybrid powertrain, or when the energy storage device must be charged, the internal combustion engine must be started quickly and efficiently.

A large torque is required to operate a heavy vehicle. Especially during the starting process and also under certain operating conditions, such as driving uphill, a large torque must be supplied to the driving shafts of the vehicle. In a hybrid vehicle, both the combustion engine and the electrical machine may generate a torque to the vehicle's driving shafts simultaneously. However, it has turned out that the torque generated jointly by the combustion engine and the electrical machine is insufficient to propel the vehicle in all operating conditions.

Conventional heavy vehicles may be equipped with a range gearbox, which considerably upshifts the torque from the vehicle's combustion engine to the driving shafts. Such a range gearbox doubles the number of gear ratio possibilities and usually comprises a planetary gear, with a low and a high gear, respectively, with which the gear ratio possibilities of the main gearbox may be divided into a low range position and a high range position. In the low range position, a downshift of the rotational speed occurs through the planetary gear, and in the high range position the gear ratio is 1:1 through the planetary gear.

The document EP-B1-1126987 shows a gearbox with double planetary gears. The sun wheel of each planetary gear is connected to an electrical machine, and the ring gears of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the internal combustion engine's output shaft.

Document US-A1-20050227803 shows a vehicle transmission with two electrical machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double clutch interacts with the second planetary gear. Both planetary gears also interact with each other via a cogwheel transmission.

SUMMARY OF THE INVENTION

Despite prior art solutions in the field, there is a need to further develop a method to control such a hybrid powertrain, in order to achieve gear shifts without any torque interruption and optimal brake regeneration, as well as in order to achieve a large torque and a large number of gear steps.

The objective of the invention is to provide a novel and advantageous method to control a hybrid powertrain, in order to achieve gear shifts without any torque interruption and optimal brake regeneration, as well as in order to achieve a large torque and a large number of gear steps.

Another objective of the invention is to provide a novel and advantageous computer program to control a hybrid powertrain.

The method according to the invention enables an efficient and reliable method to control a hybrid powertrain, in order to achieve a shift from a low range position to a high range position, wherein the hybrid powertrain comprises an internal combustion engine; a gearbox with an input shaft and an output shaft; a range gearbox connected to the output shaft; a first planetary gear, connected to the input shaft; a second planetary gear, connected to the first planetary gear; a first electrical machine, connected to the first planetary gear; a second electrical machine, connected to the second planetary gear; at least one gear pair, connected with the first planetary gear and the output shaft; and at least one gear pair connected with the second planetary gear and the output shaft, wherein the internal combustion engine is connected with the first planetary gear via the input shaft. By a) engaging a gear by connecting two rotatable components in the first planetary gear; b) connecting the at least one gear pair connected with the second planetary gear and the output shaft; c) connecting a sixth gear pair, arranged between a countershaft and the range gearbox, with the countershaft, so that the countershaft is connected with the output shaft via the range gearbox; d) controlling the range gearbox from a low range position to a neutral position, in which no torque transmission occurs through the range gearbox; e) controlling to a synchronized rotational speed between two rotatable components, by means of the first electrical machine; f) connecting the rotatable components by means of a displaceable third coupling device; and g) engaging a gear by connecting two rotatable components in the second planetary gear, a control of the hybrid powertrain is achieved, such that a large torque and a large number of gear steps is achieved.

The fact that the range gearbox is in a low range position suitably comprises that a rotatable component in the range gearbox is connected with a gearbox housing. Suitably, a third ring gear in the range gearbox is connected with the gearbox housing by means of the third coupling device. Thus, step d) suitably comprises disconnection of the rotatable component in the range gearbox from the gearbox housing.

The first planetary gear is suitably connected to the input shaft and a first main shaft. The second planetary gear is suitably connected to a second main shaft. The at least one gear pair connected with the first planetary gear and the output shaft is suitably arranged between the first main shaft and the countershaft. The at least one gear pair connected with the second planetary gear and the output shaft is suitably arranged between the second main shaft and the countershaft.

According to one embodiment, the method also comprises the additional step, before step a): j) preventing a rotatable component in the range gearbox from rotating. In the event that the range gearbox is not already in a low range position, a rotatable component in the range gearbox may be prevented from rotating, and thus a low range position is achieved in the range gearbox. Suitably, step j) comprises connecting a rotatable component in the range gearbox with a gearbox housing. Suitably, a third ring gear in the range gearbox is connected with the gearbox housing by means of the third coupling device.

The steps a), b) and j) may be performed in any order or in parallel. The measures according to steps a), b) and j) may also be completed in gear steps carried out previously. In this way, a shift from a gear in a low range position to a gear in a high range position is achieved.

According to one embodiment, the method comprises, in step e), that the first and/or the second electrical machine is driven by electric power from an energy storage device. Thus, a shift of the range gearbox in the hybrid powertrain may be carried out without torque interruption. Should, however, the energy storage device be empty or lack a sufficient amount of energy to drive the first and/or the second electrical machine, a shift of the range gearbox in the hybrid powertrain will be performed with torque interruption. A strategic choice may also involve to not collect energy from the energy storage device at a shift operation, for example when it is disadvantageous to collect energy from the energy storage device or when it is deemed that a torque interruption will not significantly impact the progress of the vehicle operated with the hybrid powertrain.

By connecting two rotatable components in the first planetary gear, torque generated by the internal combustion engine and/or the first electrical machine is transferred through the first planetary gear to the first main shaft, and thereby on to the output shaft. Thus, a gear engagement is achieved, such that propulsion may occur by means of the internal combustion engine and/or the first electrical machine.

By connecting two rotatable components in the second planetary gear, torque generated by the internal combustion engine and/or the second electrical machine is transferred via the second planetary gear to the second main shaft, and thereby on to the output shaft. Thus, a gear engagement is achieved, such that propulsion may occur by means of the internal combustion engine and/or the second electrical machine.

Suitably, step a) comprises that a first sun wheel in the first planetary gear and a first planetary wheel carrier in the first planetary gear are connected by means of a first coupling device. Further, step g) suitably comprises connection of a second sun wheel in the second planetary gear and a second planetary wheel carrier in the second planetary gear by means of a second coupling device.

The coupling devices and the locking mechanisms preferably comprise an annular sleeve, which is displaced axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

In order to connect the sun wheel and the planetary wheel carrier of the respective planetary gear by means of the first and the second coupling device, respectively, the internal combustion engine and/or the first electrical machine and/or the second electrical machine is controlled, such that a synchronous rotational speed is achieved between the sun wheel and the planetary wheel carrier. When a synchronous rotational speed has been achieved, the coupling device is displaced, so that the sun wheel and the planetary wheel carrier are mechanically connected with each other.

In order to disconnect the sun wheel and the planetary wheel carrier in the respective planetary gear, the first and/or second electrical machine is controlled, such that torque balance is achieved in the planetary gear. When torque balance has been achieved, the coupling device is displaced, so that the sun wheel and the planetary wheel carrier are no longer mechanically connected with to each other.

Torque balance relates to a state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the ring gear or planetary wheel carrier, are connected with the use of a coupling device, this coupling device does not transfer any torque between the planetary gear's parts when torque balance prevails. Accordingly, the coupling device may easily be displaced and the planetary gear's components may be disconnected.

BRIEF DESCRIPTION OF THE DRAWINGS

Below is a description, as an example, of preferred embodiments of the invention with reference to the enclosed drawings, on which.

DETAILED DESCRIPTION OF THE INVENTION

Figure 1:
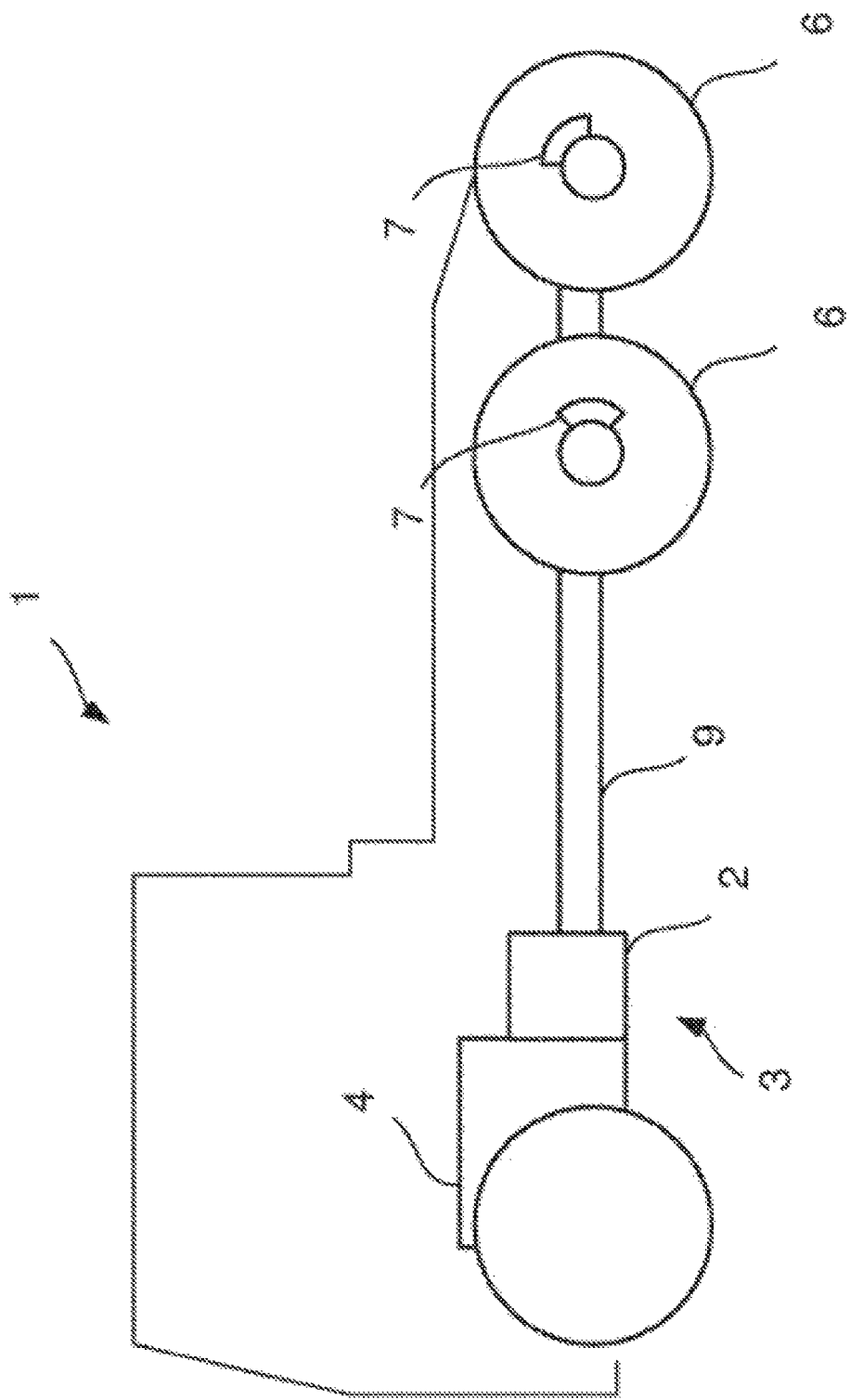
FIG. 1 schematically shows a side view of a vehicle with an internal combustion engine and a hybrid powertrain according to the present invention.

FIG. 1 shows a schematic side view of a vehicle 1, comprising a gearbox 2 and an internal combustion engine 4, which are comprised in a hybrid powertrain 3. The internal combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2:
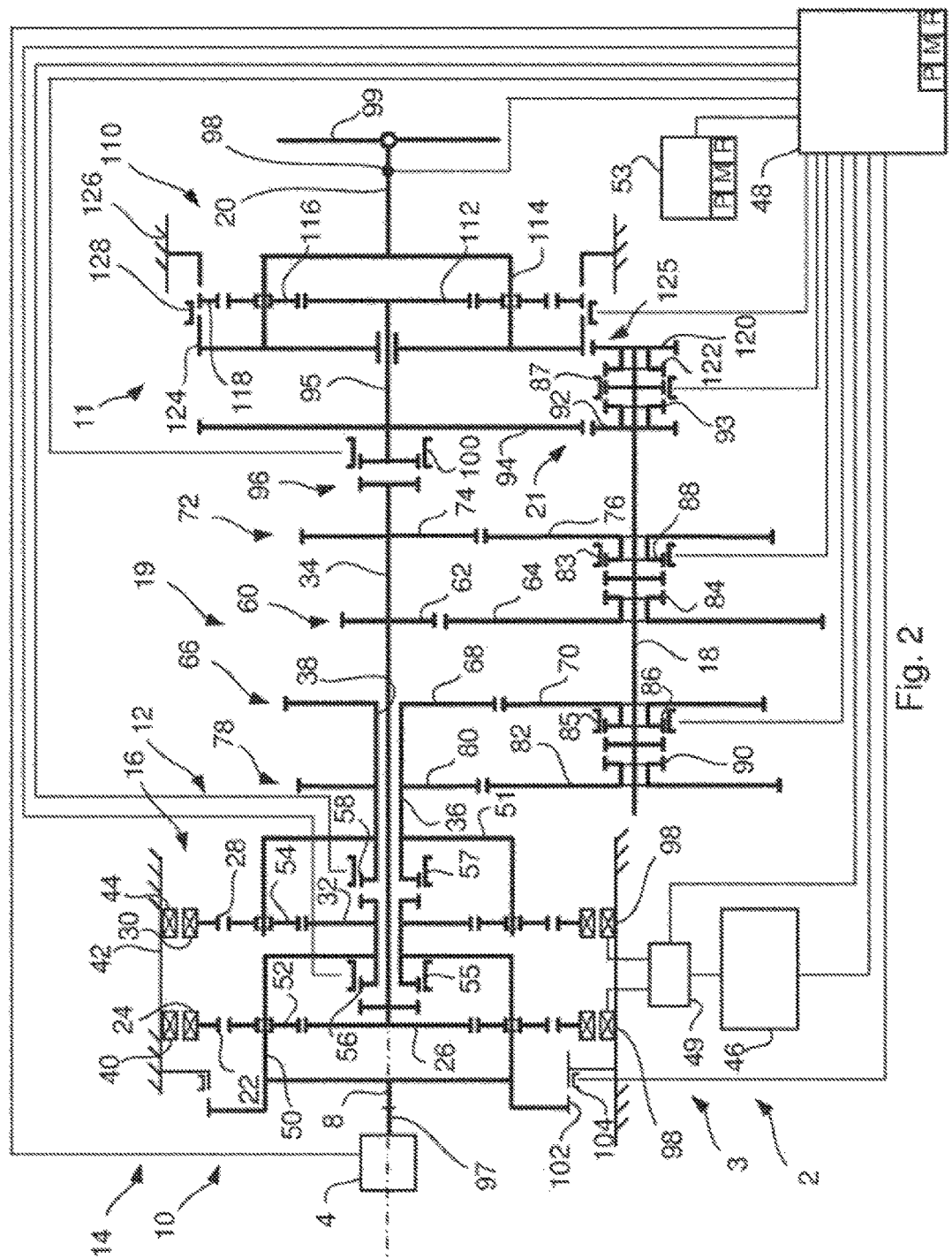
FIG. 2 shows a schematic side view of a hybrid powertrain, according to the present invention.

FIG. 2 shows a schematic side view of a hybrid powertrain 3 according to a first embodiment. The hybrid powertrain 3 is equipped with a gearbox 2, comprising an input shaft 8, a first and a second planetary gear 10 and 12, respectively, a first and a second electrical machine 14 and 16, respectively, a countershaft 18, a range gearbox 11 and an output shaft 20. The first planetary gear 10 has a first ring gear 22, to which a first rotor 24 of the first electrical machine 14 is connected. The first planetary gear 10 also has a first sun wheel 26. The second planetary gear 12 has a second ring gear 28, to which a second rotor 30 of the second electrical machine 16 is connected. The second planetary gear 12 has a second sun wheel 32. The first and the second sun wheels 26 and 32, respectively, are coaxially arranged, which, according to the embodiment displayed, means that a first main shaft 34 arranged on the first sun wheel 26 extends inside a second main shaft 36, which is arranged on the second sun wheel 32 and equipped with a central boring 38. It is also possible to arrange the first main shaft 34 in parallel with, and next to, the second main shaft 36.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via the gear housing 42 surrounding the gearbox 2. The first and the second electrical machine 16 are connected to an energy storage device 46, such as a battery, which, depending on the vehicle's 1 operating mode, operates the electrical machines 14 and 16. At other operating modes, the electrical machines 14 and 16, respectively, may work as generators, wherein power is supplied to the energy storage device 46. An electronic control unit 48 is connected to the energy storage device 46, and controls the supply of power to the electrical machines 14 and 16. Preferably the energy storage device 46 is connected to the electrical machines 14 and 16, respectively, via a switch 49, which is connected to the control unit 48. In some operating modes, the electrical machines 14 and 16, respectively, may also drive each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control unit 48 and the gearbox 2.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The first set of planetary wheels 52 interacts with the first ring gear 22 and the first sun wheel 26. The second set of planetary wheels 54 interacts with the second ring gear 28 and the second sun wheel 32. The input shaft 8 of the gearbox 2 is connected with the first planetary wheel carrier 50.

A first coupling device 56 is arranged between the first sun wheel 26 and the first planetary wheel carrier 50. By arranging the first coupling device 56, such that the first sun wheel 26 and the first planetary wheel carrier 50 are connected with each other, and therefore cannot rotate in relation to each other, the first planetary wheel carrier 50 and the first sun wheel 26 will rotate with equal rotational speeds.

A second coupling device 58 is arranged between the second sun wheel 32 and the second planetary wheel carrier 51. By arranging the second coupling device 58, such that the second sun wheel 32 and the second planetary wheel carrier 51 are connected with each other, and therefore cannot rotate in relation to each other, the second planetary wheel carrier 51 and the first sun wheel 32 will rotate with equal rotational speeds.

Preferably, the first and second coupling devices 56, 58 comprise a first and a second splines-equipped coupling sleeve 55 and 57, respectively, which is axially displaceable on a splines-equipped section on the first and second, respectively, planetary wheel carrier 50 and 51, and on a splines-equipped section on the respective sun wheels 26 and 32. By displacing the respective coupling sleeve 55, 57, such that the splines-equipped sections are connected via the respective coupling sleeves 55, 57, the first planetary wheel carrier 50 and the first sun wheel 26, as well as the second planetary wheel carrier 51 and the second sun wheel 32, respectively, become mutually interlocked with each other and cannot rotate in relation to each other.

The first and second coupling device 56, 58, according to the embodiment displayed in FIG. 2, are arranged between the first sun wheel 26 and the first planetary wheel carrier 50, and between the second sun wheel 28 and the second planetary wheel carrier 51, respectively. However, it is possible to arrange an additional or alternative coupling device (not displayed) between the first ring gear 22 and the first planetary wheel carrier 50, and also to arrange an additional or alternative coupling device (not displayed) between the second ring gear 28 and the second planetary wheel carrier 51.

A transmission device 19, which comprises a first gear pair 60, arranged between the first planetary gear 10 and the output shaft 20, is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and disconnected from the countershaft 18 by means of the first, second, third and fourth coupling elements 84, 86, 88 and 90, respectively. The coupling elements 84, 86, 88 and 90, respectively, preferably consist of splines-equipped sections on the cogwheels 64, 70, 76 and 82, respectively, and on the countershaft 18, which interact with the fifth and sixth coupling sleeves 83, 85 which engage mechanically with the splines-equipped sections of the respective first to fourth cogwheel 64, 70, 76 and 82 and of the countershaft 18. The first and third coupling elements 84, 88 are preferably equipped with a common coupling sleeve 83, and the second and fourth coupling elements 86, 90 are preferably equipped with a common coupling sleeve 85. In the disconnected state, a relative rotation may occur between the respective cogwheels 64, 70, 76 and 82 and the countershaft 18. The coupling elements 84, 86, 88 and 90, respectively, may also consist of friction clutches. On the countershaft 18 a fifth cogwheel 92 is also arranged, which engages with a sixth cogwheel 94, which is arranged on the input shaft 95 of the range gearbox 11. The sixth cogwheel 94 may be arranged in such a way that it may be connected to and disconnected from the input shaft 95 of the range gearbox 11.

The countershaft 18 is arranged between the respective first and second planetary gear 10, 12 and the output shaft 20. The countershaft 18 is connected with the input shaft 95 of the range gearbox 11 via a fifth gear pair 21, comprising the fifth and the sixth cogwheels 92, 94. The fifth cogwheel 92 is arranged so it may be connected with and disconnected from the countershaft 18 via a fifth coupling element 93.

By disconnecting the fifth cogwheel 92, which is arranged to be disconnectable from the countershaft 18, it is possible to transfer torque from the second planetary gear 12 to the countershaft 18 via, for example, the second gear pair 66, and to further transfer torque from the countershaft 18 to the output shaft 20 via, for example, the first gear pair 60. Thus, a number of gear steps is obtained, wherein torque from one of the planetary gears 10, 12 may be transferred to the countershaft 18, and further from the countershaft 18 to the main shaft 34, 36, connected with the second planetary gear 10, 12, in order to finally transfer torque to the output shaft 20 of the gearbox 2. This presumes, however, that a coupling mechanism 96, arranged between the first main shaft 34 and the range gearbox's 11 input shaft 95, is connected, which is described in more detail below.

The fifth cogwheel 92 may be locked to and disconnected from the countershaft 18 by means of a fifth coupling element 93. The coupling element 93 preferably consists of splines-equipped sections on the fifth cogwheel 92 and the countershaft 18, which sections interact with a ninth coupling sleeve 87, which engages mechanically with the splines-equipped sections of the fifth cogwheel 92 and the countershaft 18. In the disconnected state, a relative rotation may occur between the fifth cogwheel 92 and the countershaft 18. The fifth coupling element 93 may also consist of friction clutches.

Torque transfer from the input shaft 8 of the gearbox 2 to the output shaft 20 of the gearbox 2 may occur via the first or the second planetary gear 10 and 12, respectively, and the countershaft 18. The torque transfer may also occur directly via the first planetary gear 10, whose first sun wheel 26 is connected, via the first main shaft 34, to the input shaft 95 of the range gearbox 11 via a coupling mechanism 96. The coupling mechanism 96 preferably comprises a splines-equipped seventh coupling sleeve 100, which is axially displaceable on the first main shaft 34 and on the splines-equipped sections of the input shaft 95 of the range gearbox 11. By displacing the seventh coupling sleeve 100, such that the splines-equipped sections are connected via the seventh coupling sleeve 100, the first main shaft 34 becomes locked with the input shaft 95 of the range gearbox 11, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order to finally transfer torque via the coupling mechanism 96 to the output shaft 20 of the gearbox 2, via the range gearbox 11.

During operation, the gearbox 2 may in some operating modes operate in such a manner that one of the sun wheels 26 and 32, respectively, is locked with the first and the second planetary wheel carrier 50 and 51, respectively, by means of the first and the second coupling device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque addition, in order to thus increase the torque at the output shaft 20. In some operating modes, the electrical machines 14 and 16, respectively, will supply each other with electric power, independently of the energy storage device 46.

In order to upshift the torque and thus increase the torque at the output shaft 20, the range gearbox 11 is arranged in the gearbox 2. The range gearbox 11 is preferably configured as a planetary gear, but may also be configured as one or several gear pairs. According to the embodiment shown in FIG. 2, the range gearbox 11 is configured as a third planetary gear 110 with a third sun wheel 112, a third planetary wheel carrier 114 on which a third set of planetary wheels 116 is mounted, and a third ring gear 118. The third set of planetary wheels 116 interacts with the third ring gear 118 and the third sun wheel 112. The input shaft 95 of the range gearbox 11 is connected with the third sun wheel 112. The output shaft 20 is connected with the third planetary wheel carrier 114. A seventh cogwheel 120 may be locked to and disconnected from the countershaft 18 by means of a seventh coupling element 122, which preferably consists of splines-equipped sections on the seventh cogwheel 120 and the countershaft 18, which sections interact with the ninth coupling sleeve 87, which engages mechanically with the splines-equipped sections of the seventh cogwheel 120 and the countershaft 18. In the disconnected state, a relative rotation may occur between the seventh cogwheel 120 and the countershaft 18. The seventh coupling element 122 may also consist of friction clutches. The seventh cogwheel 120 engages with an eight cogwheel 124, which is arranged on the third planetary wheel carrier 114, which eighth cogwheel may, for example, consist of a sprocket 124 arranged on the third planetary wheel carrier 114, entailing that the rotational movement and torque may be transferred between the seventh cogwheel 120 and the third planetary wheel carrier 114. The seventh cogwheel 120 and the sprocket 124 on the third planetary wheel carrier 114 jointly form a seventh gear pair 125. When the seventh cogwheel 120 is locked on the countershaft 18 by means of the ninth coupling sleeve 87 and the seventh coupling element 122, the rotational movement and torque may thus be transferred between the countershaft 18 and the third planetary wheel carrier 114.

The third ring gear 118 of the range gearbox 11 may be connected, in a low range position, with a gearbox housing 126 arranged around the range gearbox 11 by means of a third coupling device 128. A downshift of the rotational speed then takes place through the range gearbox 11, which entails a torque increase at the output shaft 20. With the third coupling device 128, the third ring gear 118 in the range gearbox 11 may also be connected, in a high range position, with the third planetary wheel carrier 114. The gear ratio through the range gearbox 11 is then 1:1. It is also possible to move the third coupling device 128 to a neutral position, in which neither the low range position nor the high range position is connected. In the neutral position, the third coupling device 128 does not connect the third ring gear 118 with the gearbox housing 126 or with the third planetary wheel carrier 114. In the neutral position, no torque is transferred through the range gearbox 11.

It is also possible that both the first and the second electrical machine 14 and 16, respectively, generate power to the energy storage device 46. At engine braking the driver releases the accelerator pedal (not displayed) of the vehicle 1. The output shaft 20 of the gearbox 2 then operates one or both electrical machines 14 and 16, respectively, while the internal combustion engine 4 and the electrical machines 14 and 16, respectively, engine brake. In this case the electrical machines 14 and 16, respectively, generate electric power, which is stored in the energy storage device 46 in the vehicle 1. This operating state is referred to as regenerative braking. In order to facilitate a more powerful braking effect the output shaft 97 of the internal combustion engine 4 may be locked, and thus be prevented from rotating. Thus, only one of or both the electrical machines 14 and 16, respectively, will function as a brake and generate electric power, which is stored in the energy storage device 46. The locking of the output shaft 97 of the internal combustion engine 4 may also be carried out when the vehicle has to be accelerated by only one or both the electrical machines 14 and 16. If the torque of one or both of the respective electrical machines 14 and 16 overcomes the torque off the internal combustion engine 4, and having regard to the gear ratio between them, the internal combustion engine 4 will not be able to resist the large torque generated by the respective electrical machines 14 and 16, so that it becomes necessary to lock the output shaft 97 of the internal combustion engine 4. The locking of the output shaft 97 of the internal combustion engine 4 is preferably carried out with a locking device 102, which is arranged between the first planetary wheel carrier 50 and the gear housing 42. By locking the first planetary wheel carrier 50 and the gear housing 42, the output shaft 97 of the internal combustion engine 4 will also be locked, since the output shaft 97 of the internal combustion engines 4 is connected with the first planetary wheel carrier 50 via the input shaft 8 of the gearbox. The locking device 102 preferably comprises a splines-equipped eighth coupling sleeve 104, which is axially displaceable on a splines-equipped section of the first planetary wheel carrier 50, and on a splines-equipped section of the gear housing. By displacing the eight coupling sleeve 104, such that the splines-equipped sections are connected via the coupling sleeve 104, the first planetary wheel carrier 50, and therefore the output shaft 97 of the internal combustion engine 4, is prevented from rotating.

The control unit 48 is connected to the electrical machines 14 and 16, respectively, in order to control the respective electrical machines 14 and 16 in such a way that they, during certain operating modes, use stored electric power to supply driving power to the output shaft 20 of the gearbox 2, and during other operating modes use the kinetic energy of the output shaft 20 of the gearbox 2 to extract and store electric power. The control unit 48 thus detects the rotational speed and/or the torque of the output shaft 97 of the internal combustion engine 4 via sensors 98 arranged at the electrical machines 14 and 16, respectively, and in the output shaft 20 of the gearbox 2, in order thus to gather information and to control the electrical machines 14 and 16, respectively, to operate either as electrical motors or generators. The control unit 48 may be a computer with software suitable for this purpose. The control unit 48 also controls the flow of power between the energy storage device 46 and the respective stators 40 and 44 of the electrical machines 14 and 16, respectively. At such times when the electrical machines 14 and 16, respectively, operate as motors, stored electric power is supplied from the energy storage device 46 to the respective stators 40 and 44. At such times when the electrical machines 14 and 16 operate as generators, electric power is supplied from the respective stators 40 and 44 to the energy storage device 46. However, as stated above, the electrical machines 14 and 16, respectively, may, during certain operating modes, supply each other with electric power, independently of the energy storage device 46.

The first, the second and the third coupling devices 56, 58 and 128, respectively, the first, second, third, fourth, fifth and seventh coupling elements 84, 86, 88, 90, 93 and 122, respectively, the coupling mechanism 96 between the first main shaft 34 and the input shaft 95 of the range gearbox 11, and the locking device 102 between the first planetary wheel carrier 50 and the gear housing 42, are connected to the control unit 48 via their respective coupling sleeves. These components are preferably activated and deactivated by electric signals from the control unit 48. The coupling sleeves are preferably displaced by non-displayed power elements, such as hydraulically or pneumatically operated cylinders. It is also possible to displace the coupling sleeves with electrically powered power elements.

The embodiment in FIG. 2 shows four pinion gears 62, 68, 74 and 80, respectively, and four cogwheels 64, 70, 76 and 82, respectively, as well as two planetary gears 10 and 12, with associated electrical machines 14 and 16. However, it is possible to configure the gearbox 2 with more or fewer pinion gears and cogwheels, and with more planetary gears with associated electrical machines.

Below, an up-shift from a first to a seventh gear will be described, wherein the gearbox 2 is arranged in a vehicle 1 and the vehicle is propelled by the internal combustion engine 4.

The input shaft 8 of the gearbox 2 is connected to the output shaft 97 of the vehicle's 1 internal combustion engine 4. The output shaft 20 of the gearbox 2 is connected to a driving shaft 99 in the vehicle 1. At idling of the internal combustion engine 4 and when the vehicle 1 is at a standstill, the input shaft 8 of the gearbox 2 rotates at the same time as the output shaft 20 of the gearbox 2 is at a standstill. The locking device 102 is deactivated, so that the output shaft 97 of the internal combustion engine 4 may rotate freely. Since the input shaft 8 of the gearbox 2 rotates, the first planetary wheel carrier 50 will also rotate, which entails that the first set of planetary wheels 52 will rotate. Since the first planetary wheel carrier 50 is connected to the second sun wheel 32, the second sun wheel 32, and thus also the second set of planetary wheels 54, will rotate. By not supplying current to the first and the second electrical machines 14 and 16, respectively, the respective first and the second ring gears 22 and 28, which are connected with the respective first and second rotor 24 and 30 of the electrical machines 14 and 16, respectively, will rotate freely, so that no torque is carried by the respective ring gears 22 and 28. The respective first and the second coupling devices 56 and 58 are disconnected and thus not actuated. Thus, no torque will be transferred from the internal combustion engine 4 to the sun wheel 26 of the first planetary gear 10, or to the planetary wheel carrier 51 of the second planetary gear 12. The coupling mechanism 96 between the first main shaft 34 and the output shaft 20 is disconnected, so that the first main shaft 34 and the output shaft 20 may rotate freely in relation to each other. Since the first planetary gear's sun wheel 26, the planetary wheel carrier 51 of the second planetary gear 12 and the output shaft 20 of the gearbox 2 are, at this stage, at a standstill, the countershaft 18 is also at a standstill. In a first step the fourth cogwheel 82 and the third cogwheel 76 are connected with the countershaft 18, by means of the fourth and third coupling elements 88 and 90, respectively. The first cogwheel 64 and the second cogwheel 70 are disconnected from the countershaft 18. Thus, the first cogwheel 64 and the second cogwheel 70 are allowed to rotate freely in relation to the countershaft 18. The fifth cogwheel 92 of the fifth gear pair 21 is locked on the countershaft 18 by means of the fifth coupling element 93, so that the rotation and torque may be transferred to the input shaft 95 of the range gearbox 11 via the sixth cogwheel 94. The seventh cogwheel 120, which engages with the sprocket 124 on the range gearbox's 11 third planetary carrier, is disconnected from the countershaft 18 by means of the seventh coupling element 122. The third ring gear 118 in the range gearbox 11 may be connected with the gearbox housing 126 in a low range position, by means of a third coupling device 128. The third ring gear 118 in the range gearbox 11 is connected with the gearbox housing 126 via the third coupling device 128, so that the range gearbox 11 is shifted to the low range position.

In order to start the rotation of the output shaft 20 of the gearbox 2, with the objective of driving the vehicle 1, the fourth pinion gear 80 and the fourth cogwheel 82 on the countershaft 18 must be brought to rotate. This is achieved by making the second planetary wheel carrier 51 rotate. When the second planetary wheel carrier 51 rotates, the second main shaft 36 will also rotate, and thus the fourth pinion gear 80, which is arranged on the second main shaft 36, also rotates. The second planetary wheel carrier 51 is made to rotate by controlling the second ring gear 28 with the second electrical machine 16. By activating the second electrical machine 16 and controlling the internal combustion engine 4 to a suitable engine speed, the vehicle 1 begins to move as the second main shaft 36 begins to rotate. When the second planetary wheel carrier 51 and the second sun wheel 32 achieve the same rotational speed, the second sun wheel 32 is locked with the second planetary wheel carrier 51, by means of the second coupling device 58. As mentioned above, the second coupling device 58 is preferably configured, such that the second sun wheel 32 and the second planetary wheel carrier 51 engage mechanically with each other. Alternatively, the second coupling device 58 may be configured as a slip brake or a disc clutch which connects, in a smooth way, the second sun wheel 32 with the second planetary wheel carrier 51. When the second sun wheel 32 is connected with the second planetary wheel carrier 51, the second planetary wheel carrier 51 will rotate with the same rotational speed as the output shaft 97 of the internal combustion engine 4. Thus, the torque generated by the internal combustion engine 4 is transferred to the output shaft 20 of the gearbox 2 via the fourth pinion gear 80, the fourth cogwheel 82 on the countershaft 18, the fifth cogwheel 92 on the countershaft 18, and the sixth cogwheel 94 on the input shaft 95 of the range gearbox 11. A downshift of the rotational speed takes place through the range gearbox 11, which is shifted to the low range. Finally, the propulsion torque is transferred to the output shaft 20 of the gearbox 2 via the third planetary wheel carrier 114 of the range gearbox 11. The vehicle 1 will thus begin to move off and be propelled by a first gear.

Each of the first, second, third and fourth gear pairs 60, 66, 72, 78 has a gear ratio, which is adapted to the desired driving characteristics of the vehicle 1. According to the example embodiment displayed in FIG. 2, the fourth gear pair 78 has the highest gear ratio compared to the first, second and third gear pairs 60, 66, 72, which results in the fourth gear pair 78 being connected when the lowest gear is engaged. The second gear pair 66 transfers, as does the fourth gear pair 78, torque between the second main shaft 36 and the countershaft 18, and could instead be configured with the highest gear ratio, compared with the other gear pairs 60, 72, 78, which is why in such an embodiment the second gear pair 66 would be connected when the lowest gear is engaged.

When the countershaft 18 is made to rotate by the fourth cogwheel 82 on the countershaft 18, the third cogwheel 76 on the countershaft 18 will also rotate. Thus, the countershaft 18 drives the third cogwheel 76, which in turn drives the third pinion gear 74 on the first main shaft 34. When the first main shaft 34 rotates, the first sun wheel 26 will also rotate, and, depending on the rotational speed of the output shaft 97 of the internal combustion engine 4 and thus on the rotational speed of the first planetary wheel carrier 50, it will cause the first ring gear 22 and the first rotor 24 of the first electrical machine 14 to rotate. In this case it is possible to allow the first electrical machine 14 to operate as a generator, in order to supply power to the energy storage device 46, and/or to supply power to the second electrical machine 16. It is also possible for the second electrical machine 16 to be operated as a generator. Alternatively, the first electrical machine 14 may provide a torque addition, by way of the control unit 48 controlling the first electrical machine 14 to provide a driving torque.

In order to shift gears from the first to the second gear, the locking between the second sun wheel 32 and the second planetary wheel carrier 51 must cease, which is achieved by controlling the first and/or the second electrical machine 14, 16 such that torque balance is achieved in the second planetary gear 12. Subsequently, the second coupling device 58 is controlled, such that it disconnects the second sun wheel 32 and the second planetary wheel carrier 51 from each other. The second planetary wheel carrier 51 and also the second main shaft 36 may rotate freely, which entails that the second sun wheel 32, the second planetary wheel carrier 51 and the second main shaft 36 no longer drive the fourth pinion gear 80, arranged on the second main shaft 36. This requires that the second electrical machine 16 does not drive the second ring gear 28. The second gear is connected, by way of the control unit 48 controlling the internal combustion engine 4, such that a synchronous rotational speed arises between the first planetary wheel carrier 50 and the first sun wheel 26, in order to achieve a locking between the first planetary wheel carrier 50 and the first sun wheel 26. This is achieved by controlling the first coupling device 56, such that the first planetary wheel carrier 50 and the first sun wheel 26 are mechanically connected with each other. Alternatively, the first coupling device 56 may be configured as a slip brake or a disc clutch, which connects, in a smooth way, the first sun wheel 26 with the first planetary wheel carrier 50. By synchronizing the control of the internal combustion engine 4 and the second and first electrical machine 14 and 16, respectively, a soft and disruption-free transition from a first to a second gear may be carried out.

The first main shaft 34 now rotates and is driven by the output shaft 97 of the internal combustion engine 4, and the first main shaft 34 now drives the third pinion gear 74. The first planetary wheel carrier 50 thus drives the third pinion gear 74 via the first sun wheel 26 and the first main shaft 34. Since the third cogwheel 76 is in engagement with the third pinion gear 74 and is connected with the countershaft 18, the third cogwheel 76 will drive the countershaft 18, which in turn drives the fifth cogwheel 92 on the countershaft 18. The fifth cogwheel 92 in turn drives the output shaft 20 of the gearbox 2, via the sixth cogwheel 94, which is arranged on the input shaft 95 of the range gearbox 11, and via the range gearbox 11. The vehicle 1 is now propelled with a second gear.

When the countershaft 18 is made to rotate by the third cogwheel 76, the fourth cogwheel 82 will also rotate. Thus, the countershaft 18 drives the fourth cogwheel 82, which in turn drives the fourth pinion gear 80 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also provide a torque addition, by way of the control unit 48 controlling the second electrical machine 16 to provide a propulsion torque.

In order to shift from a second gear to a third gear, the fourth cogwheel 82 on the countershaft 18 must be disconnected from the countershaft 18 with the fourth coupling element 90, so that the fourth cogwheel 82 may rotate freely in relation to the countershaft 18. Subsequently, the countershaft 18 is connected with the second cogwheel 70 on the countershaft 18, by means of the second coupling element 86. In order to achieve a connection of the countershaft 18 and the second cogwheel 70 on the countershaft 18, preferably the second electrical machine 16 is controlled, such that a synchronous rotational speed arises between the countershaft 18 and the second cogwheel 70 on the countershaft 18. A synchronous rotational speed may be determined by measuring the rotational speed of the second rotor 30 in the second electrical machine 16, and by measuring the rotational speed of the output shaft 20. Thus, the rotational speed of the second main shaft 36 and the rotational speed of the countershaft 18 may be determined by way of given gear ratios. The rotational speed of the respective shafts 18, 36 is controlled, and when a synchronous rotational speed has arisen between the countershaft 18 and the second cogwheel 70, the countershaft 18 and the second cogwheel 70 are connected by means of of the second coupling element 86.

In order to complete the shift from a second gear to a third gear, the locking between the first sun wheel 26 and the first planetary wheel carrier 50 must cease, which is achieved by controlling the first and/or the second electrical machine 16 such that torque balance is achieved in the first planetary gear 10, after which the first coupling device 56 is controlled, such that it disconnects the first sun wheel 26 and the first planetary wheel carrier 50 from each other. Subsequently, the internal combustion engine 4 is controlled, such that a synchronous rotational speed arises between the second sun wheel 32 and the second planetary wheel carrier 51, so that the second coupling device 58 may be engaged, in order thus to connect the second sun wheel 32 with the second planetary wheel carrier 51, by means of the coupling sleeve 57. By synchronizing the control of the internal combustion engine 4 and the second and first electrical machine 14 and 16, respectively, a soft and disruption-free transition from a second to a third gear may be carried out.

The third cogwheel 76 is disconnected by controlling the first electrical machine 14, such that a torque free state arises between the countershaft 18 and the third cogwheel 76. When a torque free state arises, the third cogwheel 76 is disconnected from the countershaft 18 by controlling the third coupling element 88, such that it disconnects the third cogwheel 76 from the countershaft 18. Subsequently, the first electrical machine 14 is controlled, such that a synchronous rotational speed arises between the countershaft 18 and the first cogwheel 64. When a synchronous rotational speed arises, the first cogwheel 64 is connected to the countershaft 18 by controlling the first coupling element 84, such that it connects the first cogwheel 64 on the countershaft 18. A synchronous rotational speed may be determined by measuring the rotational speed of the first rotor 24 of the first electrical machine 14 and by measuring the rotational speed of the output shaft 20, after which the rotational speeds of the shafts 18, 34 are controlled, such that a synchronous rotational speed arises. The rotational speed of the first main shaft 34 and the rotational speed of the countershaft 18 may thereby be determined by way of given gear ratios.

The second main shaft 36 now rotates with the same rotational speed as the output shaft 97 of the internal combustion engine 4, and the second main shaft 36 now drives the second pinion gear 68 via the second main shaft 36. Since the second cogwheel 70 is in engagement with the second pinion gear 68 and is connected with the countershaft 18, the second cogwheel 70 will drive the countershaft 18, which in turn drives the fifth cogwheel 92 on the countershaft 18. The fifth cogwheel 92 in turn drives the output shaft 20 of the gearbox 2, via the sixth cogwheel 94, which is arranged on the input shaft 95 of the range gearbox 11, and via the range gearbox 11. The vehicle 1 is now propelled in a third gear.

When the countershaft 18 is made to rotate by the second cogwheel 70 on the countershaft 18, the first cogwheel 64 on the countershaft 18 will also rotate. Thus, the countershaft 18 drives the first cogwheel 64, which in turn drives the first pinion gear 62 on the first main shaft 34. When the first main shaft 34 rotates, the first sun wheel 26 will also rotate, and, depending on the rotational speed of the output shaft 97 of the internal combustion engine 4, and thus on the rotational speed of the first planetary wheel carrier 50, it will cause the first ring gear 22 and the first rotor 24 of the second electrical machine 16 to rotate. It is thus possible to allow the first electrical machine 14 operate as a generator, in order to supply power to the energy storage device 46, and/or to supply power to the second electrical machine 16. Alternatively, the first electrical machine 14 may provide a torque addition, by way of the control unit 48 controlling the first electrical machine 14 to provide a driving torque.

In order to complete the shift from the third to the fourth gear, the locking between the second sun wheel 32 and the second planetary wheel carrier 51 must cease, which is achieved by controlling the first electrical machine 14, such that torque balance arises in the second planetary gear 12, after which the second coupling device 58 is controlled, such that it disconnects the second sun wheel 32 and the second planetary wheel carrier 51 from each other. A fourth gear is subsequently connected, by way of the control unit 48 controlling the internal combustion engine 4, such that a synchronous rotational speed arises between the first planetary wheel carrier 50 and the first sun wheel 26, in order to achieve a locking between the first planetary wheel carrier 50 and the first sun wheel 26. This is achieved by controlling the first coupling device 56, such that the first planetary wheel carrier 50 and the first sun wheel 26 are mechanically connected with each other. By synchronizing the control of the internal combustion engine 4 and the second and first electrical machine 14 and 16 a soft and disruption-free transition from a third to a fourth gear may be carried out.

The first main shaft 34 now rotates and is driven by the output shaft 97 of the internal combustion engine 4, and the first main shaft 34 now drives the first pinion gear 62. The first planetary wheel carrier 50 thus drives the first pinion gear 62 via the first sun wheel 26 and the first main shaft 34. Since the first cogwheel 64 is in engagement with the first pinion gear 62 and is connected with the countershaft 18, the first cogwheel 64 will drive the countershaft 18, which in turn drives the fifth cogwheel 92 on the countershaft 18. The fifth cogwheel 92 in turn drive the output shaft 20 of the gearbox 2, via the sixth cogwheel 94, which is arranged on the input shaft 95 of the range gearbox 11, and via the range gearbox 11. The vehicle 1 is now propelled in a fourth gear.

When the countershaft 18 is made to rotate by the first cogwheel 64, the second cogwheel 70 will also rotate. Thus, the countershaft 18 drives the second cogwheel 70, which in turn drives the second pinion gear 68 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also provide a torque addition, by way of the control unit 48 controlling the second electrical machine 16 to provide a propulsion torque.

In order to shift gears from a fourth gear to a fifth gear, the first cogwheel 64 must be disengaged from the countershaft 18, so that the fourth gear is disengaged. This is achieved by controlling the internal combustion engine 4 and the first electrical machine 14, such that the first cogwheel 64 is brought to a torque free state in relation to the countershaft 18. When a torque free state has arisen, the first coupling element 84 is disengaged, so that the first cogwheel 64 is disconnected from the countershaft 18.

Subsequently, the rotational speed of the first main shaft 34 is synchronized with the rotational speed of the output shaft 20, after which the coupling mechanism 96 is controlled, such that it connects the first main shaft 34 with the input shaft 95 of the range gearbox 11.

Subsequently, the internal combustion engine 4 and the first electrical machine 14 are controlled, such that the propulsion torque is provided via the first main shaft 34 and via the coupling mechanism 96 to the input shaft 95 of the range gearbox 11, through the range gearbox 11, and on to the output shaft 20. By reducing the torque from the second electrical machine 16, the fifth coupling element 93 may be brought to a torque free state in relation to the countershaft 18. When a torque free state has arisen, the fifth coupling element 93 is disengaged, so that the fifth cogwheel 92 of the fifth gear pair 21 is disconnected from the countershaft 18.

Subsequently, by means of the second electrical machine 16, the rotational speed of the countershaft 18 is synchronized with the rotational speed of the third cogwheel 76, after which the third coupling element 88 is controlled, such that it connects the third cogwheel 76 with the countershaft 18. When this connection has been completed, the propulsion torque may be shared between the internal combustion engine 4, the first electrical machine 14 and the second electrical machine 16. Subsequently, torque balance is created in the first planetary gear 10, after which the first coupling device 56 disconnects the first planetary wheel carrier 50 and the first sun wheel 26 from each other. Finally, the rotational speed of the second planetary wheel carrier 51 is synchronized with the second sun wheel 32, after which the second coupling device 58 connects the second planetary wheel carrier 51 and the second sun wheel 32 with each other.

The second main shaft 36 now rotates and is driven by the output shaft 97 of the internal combustion engine 4, and the second main shaft 36 drives the second pinion gear 68. Since the second cogwheel 70 is in engagement with the second pinion gear 68 and is connected with the countershaft 18 via the second coupling element 86, the second cogwheel 70 will drive the countershaft 18, which in turn drives the third cogwheel 76 on the countershaft 18. The third cogwheel 76 in turn drives the first main shaft 34 via the third pinion gear 74, and the output shaft 20 of the gearbox 2 is thus driven via the coupling mechanism 96, which connects the first main shaft 34 with the input shaft 95 of the range gearbox 11. The vehicle 1 is now propelled in a fifth gear.

In order to shift gears from the fifth to the sixth gear, the locking between the second sun wheel 32 and the second planetary wheel carrier 51 must cease, which is achieved by controlling the first electrical machine 14 and the combustion engine 4 such that torque balance is achieved in the second planetary gear 12, after which the second coupling device 58 is controlled, such that it disconnects the second sun wheel 32 and the second planetary wheel carrier 51 from each other. A sixth gear is subsequently connected, by way of the control unit 48 controlling the internal combustion engine 4, such that a synchronous rotational speed arises between the first planetary wheel carrier 50 and the first sun wheel 26, in order to achieve a locking between the first planetary wheel carrier 50 and the first sun wheel 26. This is achieved by controlling the first coupling device 56, such that the first planetary wheel carrier 50 and the first sun wheel 26 are mechanically connected with each other. By synchronizing the control of the internal combustion engine 4 and the second and first electrical machine 14 and 16, respectively, a soft and disruption-free transition from a fifth to a sixth gear may be carried out.

The first main shaft 34 now rotates and is driven by the output shaft 97 of the internal combustion engine 4, whereat the first main shaft 34 drives the output shaft 20 of the gearbox 2 via the coupling mechanism 96, which connects the first main shaft 34 with the input shaft 95 of the range gearbox 11. The vehicle 1 is now propelled in a sixth gear.

In order to shift from a sixth to a seventh gear, the third cogwheel 76 on the countershaft 18 must first be disconnected from the countershaft 18 with the third coupling element 88, so that the third cogwheel 76 may rotate freely in relation to the countershaft 18. Subsequently, the countershaft 18 is connected with the fourth cogwheel 82 on the countershaft 18 by means of the fourth coupling element 90. When the countershaft 18 and the fourth cogwheel 82 on the countershaft 18 have a synchronous rotational speed, the fourth coupling element 90 is controlled, such that the fourth cogwheel 82 and the countershaft 18 are connected.

In order to complete the shift operation from the sixth gear to the seventh gear, the second electrical machine 16 is controlled, such that a synchronous rotational speed arises between the countershaft 18 and the seventh cogwheel 120, mounted on the countershaft 18. When a synchronous rotational speed has been obtained, the countershaft 18 and the seventh cogwheel 120 are connected by means of the seventh coupling element 122 and the ninth coupling sleeve 87. The propulsion torque may now be transferred from the first to the second electrical machine 14, 16 and on to the output shaft 20, via the fourth cogwheel 82 and the seventh cogwheel 120 on the countershaft 18, and via the range gearbox 11. When the propulsion torque is transferred to the second electrical machine 16, the second electrical machine 16 is driven by power from the energy storage device 46. In the event that the energy storage device 46 is empty, or if the energy storage device 46 does not contain a sufficient amount of energy to drive the second electrical machine 16, no torque will be supplied to the hybrid powertrain 3, so that the vehicle 1 is moved forward by the mass inertia.

Subsequently, the locking between the first sun wheel 26 and the first planetary wheel carrier 50 must cease, which is achieved by controlling the first electrical machine 14 such that no torque is transmitted in the first planetary gear 10, after which the first coupling device 56 is controlled, such that it disconnects the first sun wheel 26 and the first planetary wheel carrier 50 from each other. Here, the second electrical machine 16 must be operated with power from the energy storage device 46. In the event that the energy storage device 46 is empty, or if the energy storage device 46 does not contain a sufficient amount of energy to operate the second electrical machine 16, no torque will be supplied to the hybrid powertrain 3, so that the vehicle 1 is moved forward by the mass inertia.

Subsequently, the third coupling device 128 is moved from the position where the third ring gear 118 and the gearbox housing 126 are connected to a neutral position, which entails that the third ring gear 118 is neither connected with the gearbox housing 126, nor with the third planetary wheel carrier 114. Accordingly, no torque transmission takes place through the range gearbox 11. When the third coupling device 128 has been moved to a neutral position, the rotational speed of the third ring gear 118 of the range gearbox 11 is synchronized with the rotational speed of the third planetary wheel carrier 114 of the range gearbox 11, by means of the first electrical machine 14. The synchronization is thus completed by the first electrical machine 14, via the coupling mechanism 96, which connects the first main shaft 34 with the input shaft 95 of the range gearbox 11, and further with the third sun wheel 112. When a synchronous rotational speed has been achieved, the third coupling device 128 is moved from a neutral position to a position where the third ring gear 118 and the third planetary wheel carrier 114 are connected. The range gearbox 11 is now shifted into the high range position, in which the gear ratio through the range gearbox 11 is 1:1.

Subsequently, the internal combustion engine 4 is controlled, such that a synchronous rotational speed arises between the second sun wheel 32 and the second planetary wheel carrier 51, so that the second coupling device 58 may be engaged, in order thus to connect the second sun wheel 32 with the second planetary wheel carrier 51, via the coupling sleeve 57. The vehicle 1 is now propelled in a seventh gear.

It is possible to realize a number of additional gear steps when the range gearbox 11 is in the high range position. Preferably, the gear ratio between the seventh cog wheel 120 and the sprocket 124 on the planetary wheel carrier of the range gearbox 11 is equal to the gear ratio between the fifth and the sixth cogwheel. Accordingly, substantially equal steps are obtained between the gears in the gearbox, regardless of whether the range gearbox 11 is in the low range position or the high range position.

In order to carry out a shift operation in the opposite direction, that is to say from a high range position to a low range position, the gear steps above are carried out substantially in the opposite order.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque. However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3:
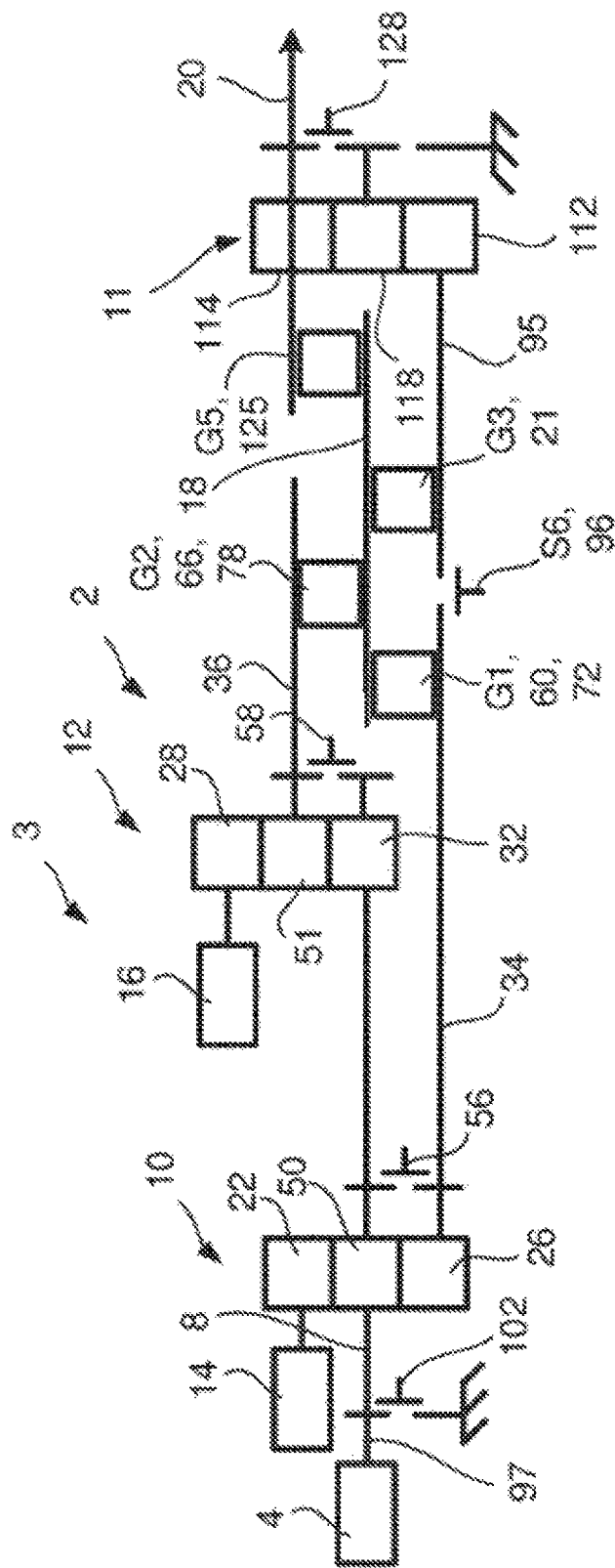
FIG. 3 shows a simplified schematic view of the hybrid powertrain in FIG. 2.

FIG. 3 illustrates the hybrid powertrain 3 according to FIG. 2 in a simplified view, where some components have been excluded for clarity. G1 in FIG. 4 consists of at least one gear pair, connected with the first main shaft 34 and therefore with the first planetary gear 10, and G2 consists of at least one gear pair, connected with the second main shaft 36 and therefore with the second planetary gear 12. These gear pairs G1, G2 are also connected to the output shaft 20 via the countershaft 18. G1 and G2, respectively, may consist of one or several gear pairs. The gear pair G1, connected with the first planetary gear 10, may for example consist of the first gear pair 60 and/or the third gear pair 72, as described in FIG. 2. The gear pair G2, connected with the second planetary gear 12, may for example consist of the second gear pair 66 and/or the fourth gear pair 78, as described in FIG. 2. Further, at least one gear pair G3, connected with the input shaft 95 of the range gearbox 11 and the countershaft 18 is displayed, which may consist of the fifth gear pair 21 described in FIG. 2. G3 may consist of one or several gear pairs. G5 relates to the sixth gear pair 125, formed by the seventh cogwheel 120 on the countershaft and the sprocket 124 on the third planetary wheel carrier 114 of the range gearbox 11.

Figure 4:
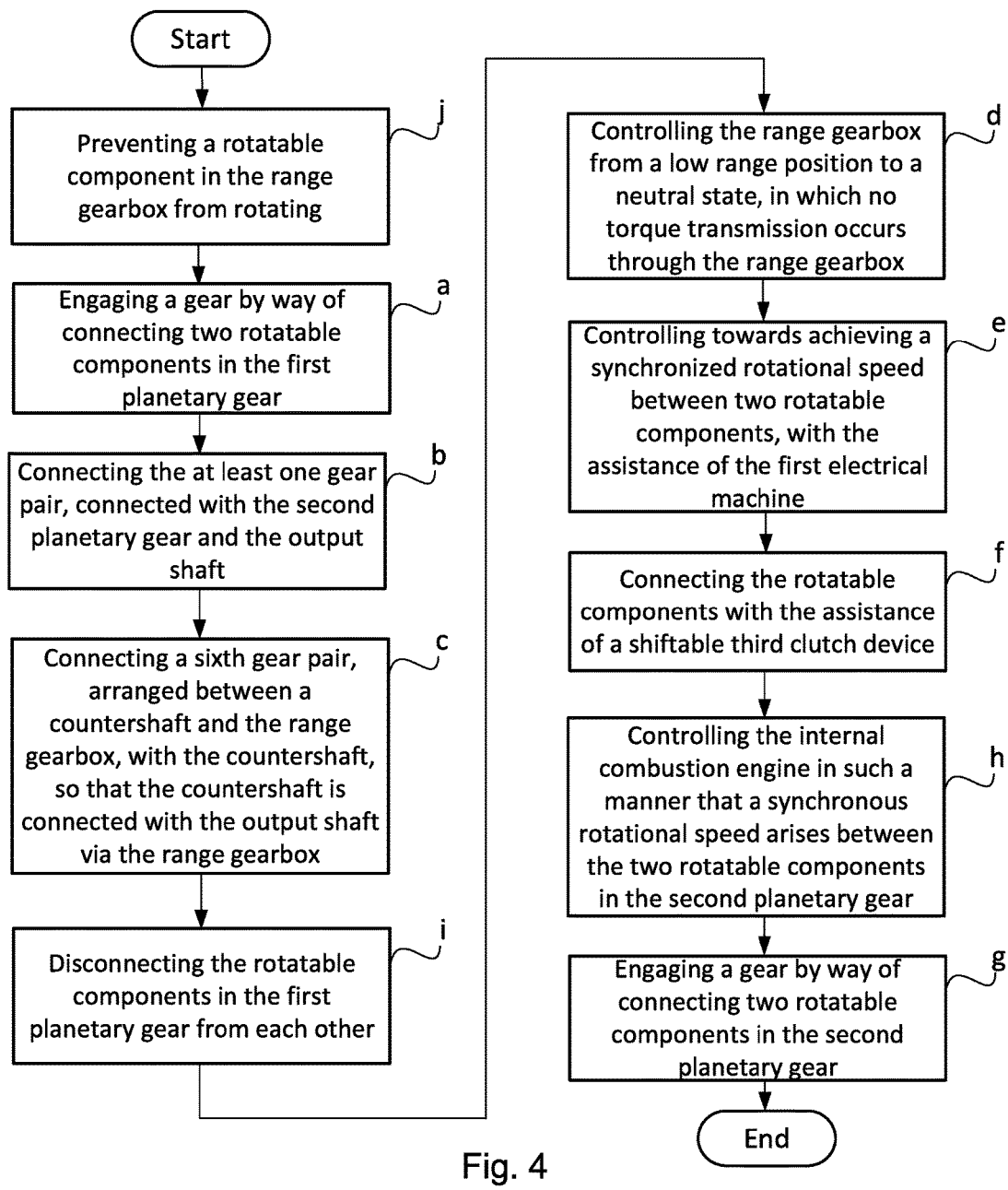
FIG. 4 shows a flow chart of the method to control a hybrid powertrain according to the present invention.

FIG. 4 shows a flow chart relating to a method to control a hybrid powertrain 3, in order to achieve a shifting from a low range position to a high range position, wherein the hybrid powertrain 3 comprises an internal combustion engine 4; a gearbox 2 comprising an input shaft 8 and an output shaft 20; a range gearbox 11, connected with the output shaft 20; a first planetary gear 10, connected to the input shaft 8; a second planetary gear 12, connected to the first planetary gear 10; a first electrical machine 14, connected to the first planetary gear 10; a second electrical machine 16, connected to the second planetary gear 12; at least one gear pair 60, 72, connected with the first planetary gear 10 and the output shaft 20; and at least one gear pair 66, 78, connected with the second planetary gear 12 and the output shaft 20, wherein the internal combustion engine 4 is connected with the first planetary gear 10 via the input shaft 8.

The method comprises the steps:

a. engaging a gear by connecting two rotatable components 22, 26, 50 in the first planetary gear 10;

b. connecting the at least one gear pair 66, 78 connected with the second planetary gear 12 and the output shaft 20;

c. connecting a sixth gear pair G5, 125, arranged between a countershaft 18 and the range gearbox 11, with the countershaft 18, so that the countershaft 18 is connected with the output shaft 20 via the range gearbox 11;

d. controlling the range gearbox 11 from a low range position to a neutral position, in which no torque transmission occurs through the range gearbox 11;

e. controlling to achieve a synchronous rotational speed between two rotatable components (e.g., a third ring gear 118 and third planetary wheel carrier 114) in the range gearbox 11 by means of the first electrical machine 14;

f. connecting the rotatable components (e.g., a third ring gear 118 and third planetary wheel carrier 114) in the range gearbox 11 by means of a displaceable third coupling device 128; and g. engaging a gear by connecting two rotatable components 28, 32, 51 in the second planetary gear 12.

According to one aspect of the invention, the method comprises the steps:

a. ensuring that a gear is engaged, wherein two rotatable components 22, 26, 50 in the first planetary gear 10 are connected;

b. ensuring that the at least one gear pair 66, 78, connected with the second planetary gear 12 and the output shaft 20, is connected;

c. connecting a sixth gear pair G5, 125, arranged between a countershaft 18 and the range gearbox 11, with the countershaft 18, so that the countershaft 18 is connected with the output shaft 20 via the range gearbox 11;

d. controlling the range gearbox 11 from a low range position to a neutral position, in which no torque transmission occurs through the range gearbox 11;

e. controlling to achieve a synchronous rotational speed between two rotatable components (e.g., a third ring gear 118 and third planetary wheel carrier 114) in the range gearbox 11 by means of the first electrical machine 14;

f. connecting the rotatable components (e.g., a third ring gear 118 and third planetary wheel carrier 114) in the range gearbox 11 by means of a displaceable third coupling device 128; and g. engaging a gear by connecting two rotatable components 28, 32, 51 in the second planetary gear 12.

By connecting the two rotatable components (e.g., a third ring gear 118 and third planetary wheel carrier 114) in the range gearbox 11 by means of the third coupling device 128, a high range position is achieved in the range gearbox 11.

The range gearbox 11 suitably consists of a third planetary gear 110 comprising a third sun wheel 112, a third planetary wheel carrier 114 and a third ring gear 118.

Suitably, step a) comprises connection of a first sun wheel 26 in the first planetary gear 10 and a first planetary wheel carrier 50 in the first planetary gear 10 by means of a first coupling device 56. Further, step g) suitably comprises connection of a second sun wheel 32 in the second planetary gear 12 and a second planetary wheel carrier 51 in the second planetary gear 12 by means of a second coupling device 58.

Suitably, step d) comprises disconnection of a rotatable component in the range gearbox 11 from the gearbox housing 126, by displacing the third coupling device 128. Suitably, the rotatable component consists of the ring gear 118 arranged in the range gearbox 11.

The method preferably comprises the additional step, following step f) and before step g): h) controlling the internal combustion engine 4, such that a synchronous rotational speed arises between the two rotatable components 28, 32, 51 in the second planetary gear 12. In this way, the two rotatable components 28, 32, 51 in the second planetary gear 12 may easily be connected in step g) by means of a second coupling device 58.

Preferably, in step f) the two rotatable components in the range gearbox 11, which are connected by means of the third coupling device 128, consist of a third ring gear 118 and a third planetary wheel carrier 114 in a third planetary gear 110.

The method preferably comprises the additional step, after step c) and before step d): i) disconnecting the rotatable components 22, 26, 50 in the first planetary gear 10 from each other. In order to be able to control the range gearbox 11 from a low range position to a neutral position and subsequently to a high range position, the rotational speed of the range gearbox's sun wheel 112 is suitably decreased, so that a synchronous rotational speed is achieved between the rotatable components (e.g., a third ring gear 118 and third planetary wheel carrier 114) in the range gearbox 11. By disconnecting the rotatable components 22, 26, 50 in the first planetary gear 10, the rotational speed of the range gearbox's sun wheel 112 may be decreased independently of the internal combustion engine's 4 speed.

The method also preferably comprises the additional step, before step a):

j) preventing a rotatable component (e.g., a third ring gear 118) in a range gearbox 11 from rotating. In the event that the range gearbox 11 is not already in a low range position, a rotatable component (e.g., a third ring gear 118) in the range gearbox 11 may be prevented from rotating, and a low range position is thereby achieved in the range gearbox 11. Suitably, step j) comprises connecting a rotatable component in the range gearbox 11 with a gearbox housing 126. Suitably, a third ring gear 118 in the range gearbox 11 is connected with the gearbox housing 126 by means of a third coupling device 128.

The steps a), b) and j) may be carried out in any order or in parallel. The measures according to steps a), b) and j) may also be completed in gear steps carried out previously.

Step j) may suitably also comprise connection of the first planetary gear 10 with an input shaft 95 to the range gearbox 11, by means of a coupling mechanism 96. Suitably, the first main shaft 34 is connected with the input shaft 95 of the range gearbox 11 by means of a coupling mechanism 96 in step j).

During steps d) and e), preferably a torque is generated with the second electrical machine 16.

In step c), the sixth gear pair G5, 125 is connected to the countershaft 18 by generating a synchronous rotational speed between the countershaft 18 and a seventh cogwheel 120 of the sixth gear pair G5, 125 arranged on the countershaft 18, by means of the second electrical machine 16.

In step e), preferably the first electrical machine 14 is controlled, such that a third sun wheel 112 in the range gearbox 11, which is connected with the input shaft 95 to the range gearbox 11, is controlled, such that it generates a synchronous rotational speed between the rotatable components (e.g., a third ring gear 118 and third planetary wheel carrier 114) in a third planetary gear 110 in the range gearbox 11.

In step e), the first and/or the second electrical machine 14; 16 is preferably operated by electric power from an energy storage device 46.

Preferably the at least one gear pair 60, 72, connected with the first planetary gear 10, comprises a pinion gear 62, 74 and a cogwheel 64, 76 in engagement with each other, which pinion gear 62, 74 is fixedly arranged with the first planetary gear 10 and which cogwheel 64, 76 may be connected with and disconnected from a countershaft 18, wherein in step b) the cogwheel 64, 76 is disconnected from the countershaft 18.

The at least one gear pair 66, 78, connected with the second planetary gear 12, preferably comprises a pinion gear 68, 80 and a cogwheel 70, 82 in engagement with each other, which pinion gear 68, 80 is fixedly arranged with the second planetary gear 12, and which cogwheel 70, 82 is connectable and disconnectable arranged on the countershaft 18, wherein in step b) the cogwheel 70, 82 is connected to the countershaft 18.

A fifth gear pair G3, 21 preferably comprises a fifth and sixth cogwheel 92; 94 in engagement with each other, which fifth cogwheel 92 is connectable and disconnectable arranged on the countershaft 18 by means of a fifth coupling element 93, wherein, in step b), the fifth cogwheel 92 is disconnected from the countershaft 18.

The output shaft 97 of the internal combustion engine 4 is preferably connected with a first planetary wheel carrier 50 arranged in the first planetary gear 10.

According to the invention, a computer program P is provided, stored in the control unit 48 and/or the computer 53, which may comprise procedures to control the hybrid powertrain 3 according to the present invention.

The program P may be stored in an executable manner, or in a compressed manner, in a memory M and/or a read/write memory.

The invention also relates to a computer program product comprising program code stored in a medium readable by a computer, to perform the method steps specified above, when said program code is executed in the control unit 48 or a computer 53 connected to the control unit 48. Said program code may be stored in a non-volatile manner on said medium readable by a computer 53.

The components and features specified above may, within the framework of the invention, be combined between different embodiments specified.

The invention claimed is:

1. A method to control a hybrid powertrain, in order to achieve a shifting from a low range position to a high range position, wherein the hybrid powertrain comprises an internal combustion engine; a gearbox with an input shaft and an output shaft; a range gearbox connected to the output shaft of the gearbox; a first planetary gear connected to the input shaft of the gearbox; a second planetary gear connected to the first planetary gear; a first electrical machine connected to the first planetary gear; a second electrical machine connected to the second planetary gear; at least one first gear pair connected to the first planetary gear and the output shaft of the gearbox; and at least second one gear pair connected to the second planetary gear and the output shaft of the gearbox, wherein the internal combustion engine is connected to the first planetary gear via the input shaft of the gearbox, said method comprising:
 a) engaging a gear by way of connecting two rotatable components in the first planetary gear;
 b) connecting the at least one second gear pair connected to the second planetary gear and the output shaft of the gearbox;
 c) connecting a sixth gear pair arranged between a countershaft and the range gearbox to the countershaft, so that the countershaft is connected to the output shaft via the range gearbox;
 d) controlling the range gearbox from a low range position to a neutral position, in which no torque transmission occurs through the range gearbox;
 e) controlling the first electrical machine to achieve a synchronous rotational speed between two rotatable components in the range gearbox;
 f) connecting the rotatable components of the range gearbox by means of a displaceable third coupling device; and
 g) engaging a gear by connecting two rotatable components in the second planetary gear.

2. The method according to claim 1, further comprising: after step f) and before step g):
 h) controlling the internal combustion engine, in such a manner that a synchronous rotational speed arises between the two rotatable components in the second planetary gear.

3. The method according to claim 1, wherein in step f) the two rotatable components in the range gearbox, which are connected with the use of the displaceable third coupling device, consist of a third ring gear and a third planetary wheel carrier in a third planetary gear.

4. The method according to claim 1 further comprising: following step c) and before step d):
 i) disconnecting the rotatable components of the first planetary gear from each other.

5. The method according to claim 1 further comprising: before step a):
 j) preventing a rotatable component in the range gearbox from rotating.

6. The method according to claim 5, wherein in step j), connecting the first planetary gear to an input shaft to the range gearbox by means of a coupling mechanism.

7. The method according to claim 1, wherein during step d) and e), a torque is generated by means of the second electrical machine.

8. The method according to claim 1, wherein in step c), the sixth gear pair is connected to the countershaft, by generating a synchronous rotational speed with the second electrical machine, between the countershaft and a seventh cogwheel of the sixth gear pair.

9. The method according to claim 1, wherein in step e) the first electrical machine is controlled in such a manner that a third sun wheel in the range gearbox, which is connected to the input shaft of the gearbox to the range gearbox, is controlled in order to generate a synchronous rotational speed between the rotatable components in a third planetary gear of the range gearbox.

10. The method according to claim 9, wherein in step e), the second electrical machine is operated by electric power from an energy storage device.

11. The method according to claim 1, wherein the at least one first gear pair, which is connected to the first planetary gear comprises a pinion gear and a cogwheel in engagement with each other, which pinion gear of the first gear pair is fixedly arranged with the first planetary gear, and which cogwheel of the first gear pair is connectable to and disconnectable from the countershaft, wherein in step b) the cogwheel is disconnected from the countershaft.

12. The method according to claim 1, wherein the at least one second gear pair, which is connected to the second planetary gear, comprises a pinion gear and a cogwheel in engagement with each other, which pinion gear of the second gear pair is fixedly arranged with the second planetary gear, and which cogwheel of the second gear pair is connectable to and disconnectable from the countershaft, wherein in step b) the cogwheel is connected to the countershaft.

13. The method according to claim 1, further comprising a fifth gear pair which comprises a fifth and sixth cogwheel in engagement with each other, wherein the fifth cogwheel of the fifth gear pair is arranged to be connected and disconnected on the countershaft using a fifth coupling element, wherein, in step b), the fifth cogwheel of the fifth gear pair is disconnected from the countershaft.

14. The method according to claim 1, wherein an output shaft of the internal combustion engine is connected to a planetary wheel carrier arranged in the first planetary gear.

15. A vehicle with a hybrid powertrain, comprising an internal combustion engine; a gearbox with an input shaft and an output shaft; a range gearbox connected to the output shaft of the gearbox; a first planetary gear connected to the input shaft of the gearbox; a second planetary gear connected to the first planetary gear; a first electrical machine connected to the first planetary gear; a second electrical machine connected to the second planetary gear; at least one first gear pair connected to the first planetary gear and the output shaft of the gearbox; and at least one second gear pair connected to the second planetary gear and the output shaft of the gearbox, wherein the internal combustion engine is connected to the first planetary gear via the input shaft of the gearbox, wherein the hybrid powertrain is controlled according to a method comprising a) engaging a gear by way of connecting two rotatable components in the first planetary gear;
b) connecting the at least one second gear pair connected to the second planetary gear and the output shaft of the gearbox;
c) connecting a sixth gear pair arranged between a countershaft and the range gearbox to the countershaft, so that the countershaft is connected to the output shaft via the range gearbox;
d) controlling the range gearbox from a low range position to a neutral position, in which no torque transmission occurs through the range gearbox;
e) controlling the first electrical machine to achieve a synchronous rotational speed between two rotatable components in the range gearbox;
f) connecting the rotatable components of the range gearbox by means of a displaceable third coupling device; and
g) engaging a gear by connecting two rotatable components in the second planetary gear.

16. A computer program comprising program code stored in a non-transitory computer-readable medium readable by a computer, said computer program used to achieve a shifting from a low range position to a high range position, wherein the hybrid powertrain comprises an internal combustion engine; a gearbox with an input shaft and an output shaft; a range gearbox connected to the output shaft of the gearbox; a first planetary gear connected to the input shaft of the gearbox; a second planetary gear connected to the first planetary gear; a first electrical machine connected to the first planetary gear; a second electrical machine connected to the second planetary gear; at least one first gear pair connected to the first planetary gear and the output shaft of the gearbox; and at least one second gear pair connected to the second planetary gear and the output shaft of the gearbox, wherein the internal combustion engine is connected to the first planetary gear via the input shaft of the gearbox, said computer program code comprising computer instructions to cause one or more computer processors to perform the operations of:

a) engaging a gear by way of connecting two rotatable components in the first planetary gear;
b) connecting the at least one second gear pair connected to the second planetary gear and the output shaft of the gearbox;
c) connecting a sixth gear pair arranged between a countershaft and the range gearbox to the countershaft, so that the countershaft is connected to the output shaft via the range gearbox;
d) controlling the range gearbox from a low range position to a neutral position, in which no torque transmission occurs through the range gearbox;
e) controlling the first electrical machine to achieve a synchronous rotational speed between two rotatable components in the range gearbox;
f) connecting the rotatable components of the range gearbox by means of a displaceable third coupling device; and
g) engaging a gear by connecting two rotatable components in the second planetary gear.

* * * * *